(12) United States Patent
Shattuck et al.

(10) Patent No.: US 7,104,699 B2
(45) Date of Patent: Sep. 12, 2006

(54) THRUST BEARING AND METHOD OF MAKING SAME

(75) Inventors: Charles W. Shattuck, West Goshen, CT (US); Robert D. Richtmeyer, Goshen, CT (US); Richard F. Murphy, Torrington, CT (US)

(73) Assignee: Timken US Corporation, Torrington, CT (US)

( * ) Notice: Subject to any disclaimer, the term of this patent is extended or adjusted under 35 U.S.C. 154(b) by 109 days.

(21) Appl. No.: 09/966,230

(22) Filed: Sep. 28, 2001

(65) Prior Publication Data

US 2003/0063828 A1    Apr. 3, 2003

(51) Int. Cl.
F16C 33/46    (2006.01)
F16C 33/58    (2006.01)
B62D 53/08    (2006.01)

(52) U.S. Cl. .................. 384/621; 384/593; 384/618; 384/569; 384/455

(58) Field of Classification Search ............... 384/621, 384/529, 593, 607, 614, 615, 618, 620, 623, 384/609, 590, 452, 455, 569, 560
See application file for complete search history.

(56) References Cited

U.S. PATENT DOCUMENTS

| | | | |
|---|---|---|---|
| 3,370,898 A * | 2/1968 | Bowen III .................. 384/621 |
| 3,734,582 A | 5/1973 | Beauchet | |
| 3,930,692 A * | 1/1976 | Condon et al. ............. 384/455 |
| 4,733,979 A * | 3/1988 | Tsuruki ....................... 384/620 |
| 4,783,183 A * | 11/1988 | Gardella ...................... 384/620 |
| 4,871,268 A | 10/1989 | Furumura et al. | |
| 4,904,094 A | 2/1990 | Furumura et al. | |
| 4,981,373 A * | 1/1991 | Bando ......................... 384/620 |
| 4,992,111 A | 2/1991 | Yamada et al. | |
| 5,110,223 A * | 5/1992 | Koch et al. .................. 384/620 |
| 5,114,249 A * | 5/1992 | Muntnich et al. ........... 384/622 |
| 5,439,300 A | 8/1995 | Hirakawa et al. | |
| 5,529,400 A * | 6/1996 | Polinsky et al. ............. 384/446 |
| 5,567,508 A | 10/1996 | Murakami | |
| 5,626,974 A | 5/1997 | Mitamura | |
| 5,658,082 A | 8/1997 | Tsushima et al. | |
| 5,800,637 A | 9/1998 | Yamamura et al. | |
| 5,821,204 A | 10/1998 | Kato et al. | |
| 5,879,086 A * | 3/1999 | Muntnich et al. ........... 384/621 |
| 5,927,868 A * | 7/1999 | Critchley et al. ........... 384/606 |
| 5,967,674 A * | 10/1999 | Reubelt et al. .............. 384/620 |
| 5,989,694 A | 11/1999 | Mitamura et al. | |
| 5,998,042 A | 12/1999 | Tanaka et al. | |
| 6,086,262 A | 7/2000 | Matsumoto | |
| 6,106,158 A * | 8/2000 | Hayashi et al. ............. 384/623 |

(Continued)

*Primary Examiner*—Richard Ridley
*Assistant Examiner*—Colby Hansen
(74) *Attorney, Agent, or Firm*—Michael Best & Friedrich LLP

(57) ABSTRACT

A first race component includes a flat, circular raceway portion, defined about an axis, and an axially extending lip portion. A plurality of needle rollers is arranged radially with respect to the axis for rolling contact with the flat raceway. A bearing cage retains the needle rollers and is engageable with the lip portion of the first component for piloting of the bearing cage. A second race component, made of different material, includes a flat portion in contact with the raceway portion of the first race component and a lip portion extending axially and radially from the flat portion and beyond the lip portion of the first race component such that the second race component is engageable by the bearing cage to hold the first race component, the second race component and the bearing cage together as an assembly.

10 Claims, 1 Drawing Sheet

U.S. PATENT DOCUMENTS 6,228,184 B1  5/2001  Tanaka et al.
6,419,398 B1  7/2002  Murphy et al.
6,520,685 B1 *  2/2003  Urmaza ..................... 384/620
6,685,360 B1  2/2004  Murphy et al.

* cited by examiner

THRUST BEARING AND METHOD OF MAKING SAME

BACKGROUND OF THE INVENTION

This invention relates generally to thrust bearings and, more particularly, to thrust races used in thrust bearings with needle rollers.

Thrust bearings with needle rollers are in general use in transmissions and similar devices to support axial loads between components. For example, such thrust bearings are used in automotive torque converters to position and support a stator. Examples of such thrust bearings with needle rollers are illustrated in FIGS. 1–4. FIG. 1 illustrates a thrust bearing 10 with needle rollers 12 retained within a bearing cage 14 and in rolling contact with raceways of an inner thrust race 16 and an outer thrust race 18 that include inner and outer lips 20 and 22, respectively, that may be used for piloting of the bearing cage 14.

FIGS. 2 and 3 illustrate a similar thrust bearing 24 with needle rollers 26 retained within a bearing cage 28 and in rolling contact with raceways of an inner thrust race 30 and an outer thrust race 32 that include inner and outer lips 34 and 36 that may be used for piloting of the bearing cage 28. To retain the inner and outer thrust races 30 and 32 and the bearing cage 28 together as an assembly, the inner and outer lips 34 and 36 have staked portions 38 and 40 extending radially outwardly and radially inwardly, respectively, over the bearing cage 28. In other thrust bearings, not illustrated, in place of the staked portions 38 and 40, the inner and outer lips may be curled along a full 360 degree circumference to retain the thrust races and the bearing cage together.

With such thrust bearings, the inner and outer thrust races must be made of bearing quality material, typically high carbon steel, to provide high quality raceways, and must be finished with a good wear surface for the needle rollers and must be thick enough to carry the high loads under the needle rollers. Because of the limited ductility of the material, the forming of staked portions 40, or similarly curled portions, is difficult and at a risk of fracturing the thrust races. In addition, the bearing quality material makes the thrust bearing expensive. FIG. 4 illustrates that an angled band 42 may be mounted over an outer thrust race 44, that is similar in function to outer thrust race 18 of FIG. 1, to overcome some of these difficulties.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a thrust bearing with needle rollers. A first race component is made of a first material and includes a flat, circular raceway portion, defined about an axis, and an axially extending lip portion. A plurality of needle rollers is arranged radially with respect to the axis for rolling contact with the flat raceway portion of the first race component. A bearing cage retains the needle rollers and is engageable with the lip portion of the first component for piloting of the bearing cage. A second race component is made of a second material and includes a flat portion in contact with the raceway portion of the first race component and, also, a lip portion extending axially and radially from the flat portion and beyond the lip portion of the first race component such that the second race component is engageable by the bearing cage to hold the first race component, the second race component and the bearing cage together as an assembly.

In another aspect of the invention, this is accomplished by providing a method of making a thrust bearing.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
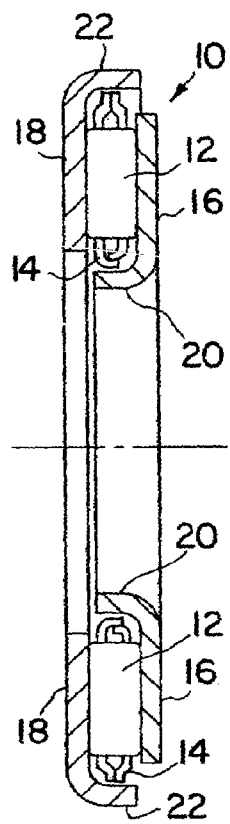
FIG. 1 is a cross sectional view of a thrust bearing with needle rollers illustrating the prior art.
Figure 3:
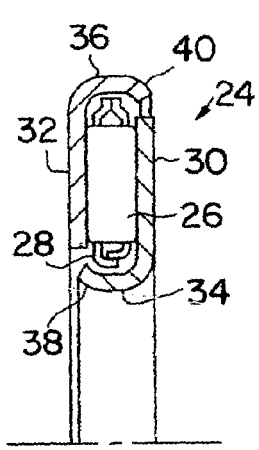
FIG. 3 is cross sectional view of the thrust bearing of FIG. 2, as indicated by the line 3—3 in FIG. 2.
Figure 4:
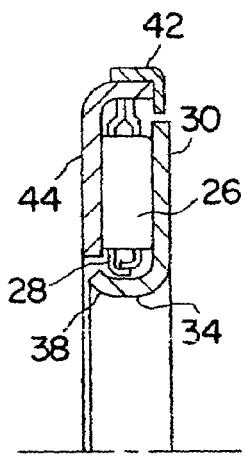
FIG. 4 is a cross sectional view of yet another thrust bearing with needle rollers illustrating the prior art.
Figure 2:
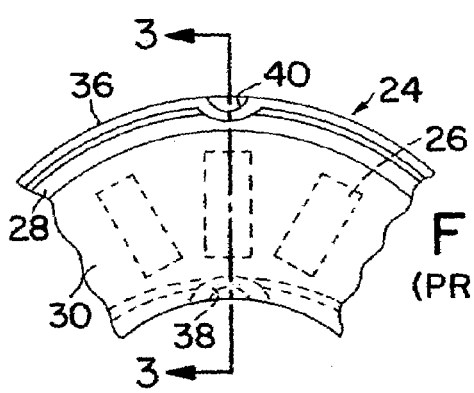
FIG. 2 is an axial view of a portion of another thrust bearing with needle rollers illustrating the prior art.
Figure 5:
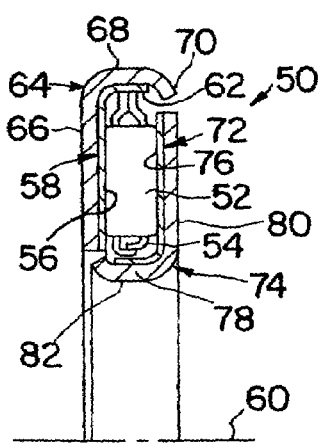
FIG. 5 is a cross sectional view of a thrust bearing with needle rollers illustrating the present invention.

Referring now to the other drawing figures, FIG. 5 illustrates a thrust bearing 50, according to the present invention, with needle rollers 52 retained within a bearing cage 54 and in rolling contact with a flat raceway portion 56 of a first race component 58. The first race component is made of a material suitable for high quality raceways, such as, for example, high carbon steel finished to a smooth wear surface. The flat raceway portion 56 is circular, defined about an axis 60. The bearing cage 54 is engageable with an axially extending lip portion 62 of the first race component 58 that may be used for piloting of the bearing cage 54.

A second race component 64 includes a flat portion 66 in contact with the raceway portion 56 of the first race component 58 and includes a lip portion 68 that extends axially and radially from the flat portion 66 and beyond the lip portion 62 of the first race component 58 such that the second race component is engageable by the bearing cage 54 to hold the first race component 58, the second race component 64 and the bearing cage 54 together as an assembly. For example, the lip portion 68 may be staked radially inwardly, or curled radially inwardly, to form retention portion 70, that has an inside diameter less than an outer diameter of the bearing cage 54.

The second race component 64 is made of a different material than that of the first race component 58. Generally, the material for the second race component 64 should be more ductile than that of the first race component 58. For example, a low carbon steel with limited surface finish requirements may be used. Such material allows more complex forming of the lip portion 68, facilitating more interference with the bearing cage 54 for a more secure snap-together fit without risk of fracturing the second race component 64. In addition, such material can be thick enough to support the raceway portion 56 and carry the high loads under the needle rollers 52 while reducing material cost.

The thrust bearing of the present invention may include only a single thrust race, comprising first and second race components 58 and 64, as illustrated, retained together with the needle rollers 52 and bearing cage 54. Alternatively, the single thrust race may be an inner thrust race; that is, it may have an axially extending lip radially inward of the bearing cage instead of radially outward of the bearing cage. As a further variation, the present invention may include both inner and outer thrust races, one or both thrust races including first and second race components, with both thrust races being retained to the bearing cage to provide an assembly.

FIG. 5 illustrates an inner thrust race comprising first and second race components 72 and 74. First race component 72 includes a raceway portion 76 for rolling contact with the needle rollers 52 and a lip portion 78 extending axially such that the bearing cage 54 may be piloted by engagement with the lip portion 78. Second race component 74 includes a flat portion 80 in contact with the raceway portion 76 and a lip portion 82 that extends axially and radially such that the lip portion 82 is engageable by the bearing cage 54 to retain the second race component 74 to the bearing cage 54, as an assembly. The materials for the first and second race components 72 and 74 are selected as discussed above with respect to race components 58 and 64.

Figure 6:
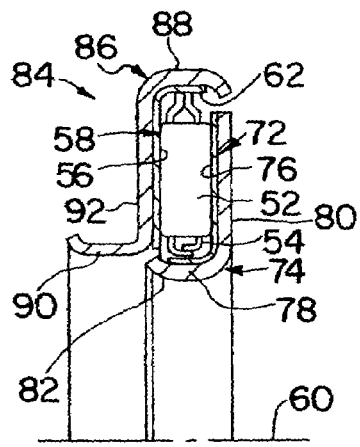
FIG. 6 is a cross sectional view of a thrust bearing with needle rollers illustrating another embodiment of the present invention.

FIG. 6 illustrates a thrust bearing 84 of the present invention with an outer thrust race comprising a second race component 86 with an axially and radially extending lip portion 88 similar to lip portion 68 of FIG. 5, such that the lip portion 88 is engageable with the bearing cage 54 to retain the second race component 86 to the bearing cage 54. In addition, the second race component 86 includes an extension portion 90 extending axially from a flat portion 92 of the second race component 86 and in a direction away from the needle rollers 52. Because the second race component 86 may be made of a ductile material, the extension portion 90 may be configured to adapt to a variety of applications and may be welded or staked to other components as required, either before or after installation.

The thrust races for the thrust bearing of the present invention may be conveniently made from sheet metal, with strips of two different materials fed into a forming machine such that the first race component and the second race component are bent simultaneously by the same forming equipment and tools. Alternatively, a first component blank or a second component blank may be fed into a forming machine with a strip of a different material such that the first and second race components are formed simultaneously. If desired, the components or component blanks may be bonded together, or to the strip of a different material, prior to forming.

The thrust races for the thrust bearing of the present invention may also be formed by forming first and second component blanks that are bent to form axially extending lip portions before being assembled together. Subsequent forming of the lip of the second race component, such as for example, retention portion 70, may be used to fix the first and second race components together. If desired, the component blanks or race components may be bonded together with a suitable known bonding material.

Having described the invention, what is claimed is:

1. A thrust bearing with needle rollers, the thrust bearing configured to support axial loading between two components, the thrust bearing comprising:

a first race component made of a first sheet metal material comprising high carbon steel and including a flat, circular raceway portion and a flat, circular supporting portion, each defined about an axis, and an axially extending lip portion;

a plurality of needle rollers arranged radially with respect to the axis for rolling contact with the flat raceway portion of the first race component;

a bearing cage retaining the needle rollers and piloting on the lip portion of the first component; and a second race component made of a second sheet metal material that is more ductile and equal to or greater in thickness than the first race component, the second race component including a flat portion in contact with the supporting portion of the first race component along substantially an entire portion of the supporting portion and, also, including a lip portion extending axially and radially from the flat portion and beyond the lip portion of the first race component such that the second race component is engageable by the bearing cage to hold the first race component, the second race component and the bearing cage together as an assembly distinct from the two components between which axial loading is supported by the thrust bearing.

2. A thrust bearing according to claim 1, wherein the axially extending lip portion of the first race component is radially outward of the raceway portion of the first race component.

3. A thrust bearing according to claim 1, wherein the axially extending lip portion of the first race component is radially inward of the raceway portion of the first race component.

4. A thrust bearing according to claim 1, further comprising an additional thrust race including a circular raceway portion for rolling contact with the rollers, the rollers being positioned between the circular raceway portions of the first race component and the additional thrust race.

5. A thrust bearing according to claim 4, wherein the additional thrust race comprises two components made of different materials, the first component of the additional thrust race defining the raceway portion and supporting portion and the second component of the additional thrust race including a flat portion in contact with the supporting portion of the first component of the additional thrust race along substantially an entire portion of the supporting portion of the additional thrust race.

6. A thrust bearing according to claim 4, wherein the additional thrust race is engageable by the bearing cage to retain the additional thrust race and the bearing cage together as an assembly.

7. A thrust bearing according to claim 1, wherein the first race component is made of bearing quality steel and the second race component is made of a more easily welded material.

8. A thrust bearing according to claim 1, wherein the second race component is made of a lower carbon steel than the first race component.

9. A thrust bearing according to claim 1, wherein the second race component is staked, at a plurality of locations along a circumference of the lip portion of the second race component, over the lip of the first race component, such that the first race component, the second race component and the bearing cage are retained together as an assembly.

10. A thrust bearing according to claim 1, wherein the second race component includes an extension portion extending axially from the flat portion of the second race component and in a direction away from the rollers.

* * * * *